United States Patent [19]

Binding et al.

[11] 3,726,410
[45] Apr. 10, 1973

[54] SKI CLAMPING DEVICE

[75] Inventors: Kenneth W. Binding, Woburn; Stanley H. Cunningham, Everett, both of Mass.

[73] Assignee: Beatrice Foods Co., Chicago, Ill.

[22] Filed: June 11, 1971

[21] Appl. No.: 152,347

[52] U.S. Cl. ............... 211/60 SK, 211/8, 224/29 R, 280/11.37 K
[51] Int. Cl. ............................................. B60K 9/08
[58] Field of Search ............ 224/29 R, 42.1 R, 224/42.1 B, 42.1 D, 42.1 E, 42.1 F, 42.1 G; 280/11.37 K; 211/8, 60 SK

[56] References Cited

UNITED STATES PATENTS

| | | | |
|---|---|---|---|
| 3,275,160 | 9/1966 | Zurker | 224/42.1 F X |
| 3,348,747 | 10/1967 | Vuarchex | 224/42.1 F |
| 3,225,987 | 12/1965 | Bonner | 224/45 S |
| 3,378,182 | 4/1968 | McMiller | 224/42.1 G |
| 3,108,897 | 1/1962 | Carlyle | 224/45 S X |
| 3,242,704 | 3/1966 | Barreca | 211/60 SK |

*Primary Examiner*—Gerald M. Forlenza
*Assistant Examiner*—Lawrence J. Oresky
*Attorney*—Roberts, Cushman & Grover

[57] ABSTRACT

A ski clamp structure comprising a pair of transversely spaced, U-shaped receptacles rigidly joined by a V-shaped receptacle, a clamp bar pivotally connected at one end to the structure so as to overlie the open tops of the receptacle, a latch at the distal end of the clamp bar for releasably holding the bar in clamping position, said latch being adapted to be locked in operative position, a mounting bracket to which the structure is fastened, and bolts for securing the mounting bracket to a vehicle body, the heads of the bolts being located at the bottoms of the receptacles so as to be inaccessible and the threaded end of the bolts extending through apertures in the vehicle body and having threaded thereon lock nuts which are located inside the body and hence inaccessible.

6 Claims, 6 Drawing Figures

PATENTED APR 10 1973 3,726,410

SKI CLAMPING DEVICE

BACKGROUND OF THE INVENTION

Ski racks for attachment to the top of a vehicle are disclosed in U.S. Pat. Nos. 2,772,824, 2,782,972 and 3,132,780. These racks are secured to the gutters at the opposite sides of the top and embody clamp bars by means of which the skis may be locked to the rack. The racks shown in the aforesaid patents comprise longitudinally spaced, transversely mounted structures and as such are not suitable for compacts, convertibles and the like. It is the purpose of this invention to provide a ski rack comprising a single structure adapted to be attached to the sloping back of a vehicle, such as a compact or a convertible, to clamp skis intermediate their ends to hold them in an upwardly and forwardly inclined position with their lower ends seated in receptacles bolted to the rear bumper, and especially to a rack adapted for this purpose which is designed to prevent unauthorized removal of the skis from the rack and unauthorized removal of the rack from the vehicle.

SUMMARY

As herein illustrated, the ski rack structure comprises a pair of transversely spaced U-shaped receptacles joined by a V-shaped receptacle, a clamp bar pivotally connected at one end to the structure so as to overlie the open tops of the receptacles to clamp pairs of skis situated in the U-shaped receptacles and poles situated in the V-shaped receptacle, a latch at the distal end of the clamp bar releasably interengageable with the structure for holding the bar in clamping position, the latch being adapted to be locked in its operative position, a mounting bracket to which the structure is fastened, said bracket being adapted to be secured to the body of the vehicle by bolts, and bolts for securing the mounting bracket to the vehicle body, said bolts extending from the bottoms of the U-shaped receptacles through the bracket member and through holes in the vehicle body, said bolts having heads at the inner sides of the U-shaped receptacles and lock nuts at the inner side of the vehicle body.

The invention will now be described in greater detail with reference to the accompanying drawings wherein.

Figure 1:
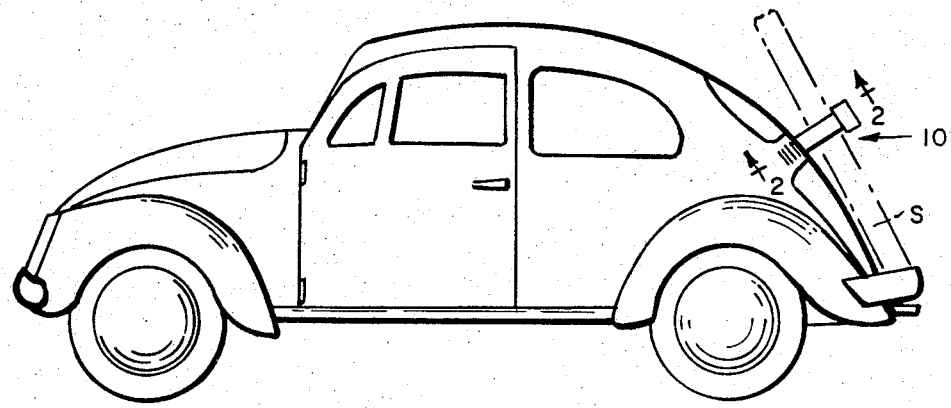
FIG. 1 is a side elevation of the vehicle to which the ski rack of this invention is especially designed to be attached.

Referring to the drawings (FIG. 1) the ski rack 10 is of the kind adapted to be attached to the back of a vehicle by fastening means extending therefrom through openings in the vehicle body, the rack engaging the skis intermediate their ends and supporting the skis with their lower ends engaged within the receptacles secured to the inner sides of the bumper at the rear of the vehicle.

Figure 2:
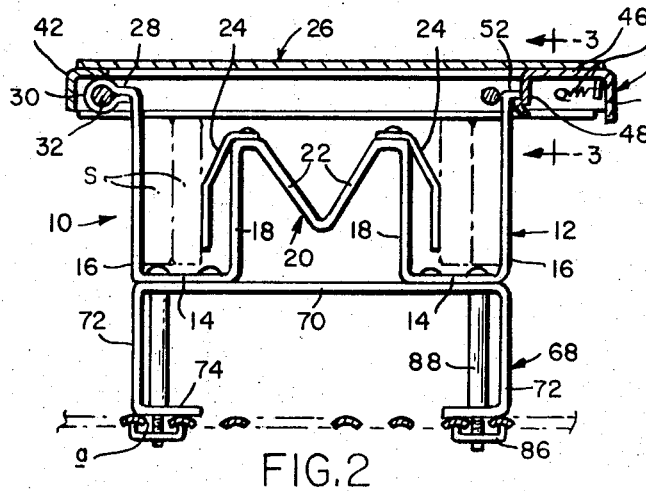
FIG. 2 is a transverse elevation, partly in section, taken on the line 2—2 of FIG. 1.

The rack 10, as illustrated in detail in FIG. 2, comprises transversely spaced, U-shaped receptacles 12—12, each having a bottom part 14 and right-angularly disposed, spaced parallel side parts 16 and 18, the side parts 18 being shorter than the side parts 16 and being rigidly connected to each other by a V-shaped receptacle 20 having side parts 22—22, the upper ends of which are integral with the upper ends of the side parts 18—18.

The U-shaped receptacles 12—12 are adapted to receive pairs of skis S on edge and the V-shaped receptacle 20 is adapted to receive pairs of ski poles. Dividers 24—24 are secured to the upper ends of the side parts 18—18 and extend downwardly and outwardly therefrom toward the outer side parts 16—16 so as to hold skis placed in the receptacles against the outer sides and to accommodate skis of different thickness.

Figure 3:
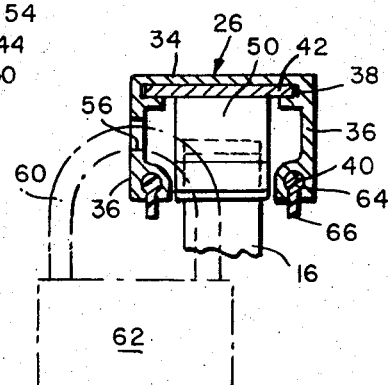
FIG. 3 is a section taken on line 3—3 of FIG. 2.
Figure 4:
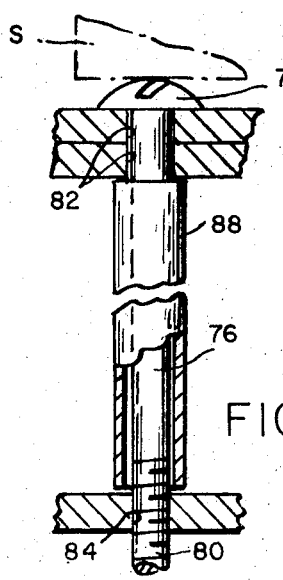
FIG. 4 is a fragmentary view, partly in section, showing the means for attaching the rack to the vehicle.

A clamp bar 26 is mounted across the open tops of the receptacles for engagement with the upper edges of the skis to hold them in place. For this purpose the upper end of the side part 16 at the left side, as shown in FIG. 2, has a laterally extending part 28 formed into a sleeve 30 for reception of a bolt 32 or rivet by means of which the clamp bar 26 is pivotally connected to the structure. As illustrated (FIG. 3) the clamp bar 26 is of rectangular cross-section, having a back part 34 and spaced parallel side parts 36—36. The bar is an aluminum extrusion and has interiorly thereof at the intersection of the back part with the side parts grooves 38—38 of rectangular configuration and in the ends of the side parts 36—36 grooves 40—40 of key-hole configuration. An angle member 42 is inserted in one of the open ends of the bar and is welded or otherwise secured thereto to close that end. The side parts 36—36 at the closed end contain aligned openings through which the pin 32 is inserted for pivotally supporting the bar.

A latch member 44 is mounted in the opposite open end of the bar comprising a flat plate 46 slidable in the grooves 38—38, having an inner, downwardly projecting hook 48 and an outer, downwardly projecting lip 50. The upper end of the outer part 16 at the right side, as shown in FIG. 2, has a laterally extending flange 52 adapted to be interengaged with the hook 48 to hold the clamp bar over the open ends of the receptacles. A spring 54 connected at one end to the latch and at its other end to the bar yieldably holds the hook engaged with the flange. To lift the clamp bar the latch is pulled outwardly to disengage the hook 48 from the flange 52. A hole 56 is provided in one of the side parts 36 in a position forwardly of the downwardly projecting hook 48 for receiving, for example, the shackle 60 of a conventional pad lock 62 which thus prevents disengaging the hook from the flange 52 thereby locking the clamp bar in place.

To minimize damage by clamping engagement of the clamp bar with the upper edges of the skis and also to compensate for slight differences in the width of the skis, resilient blades 64—64 (FIG. 3) of rubber or comparable elastomer are mounted in the grooves 40—40 with their lower edges 66—66 extending downwardly from the sides of the bar.

The module structure comprising the U-shaped receptacles 12-12 joined by the V-shaped receptacle 20 is formed of a single piece of stiff rigid steel bent to the aforesaid configuration and preferably is coated with an elastomer, for example, by dipping or by electrolytic deposition in a fluid particle bath to provide surfaces which will be smooth, non-abrasive and non-corrosive.

For attachment to the vehicle there is provided for use in conjunction with the aforesaid module an attaching frame 68 (FIG. 2) having a back part 70 and spaced parallel side parts 72—72 at right angles thereto, the latter having at their ends inwardly, right-angularly disposed flanges 74—74 for engagement with the vehicle body. The module is secured to the back part 70, for example, by welding the bottom parts 14—14 to the part 70. Bolts 76—76 are provided for attaching the frame 68 and consequently the module to the vehicle, each bolt having a head 78 at one end and a threaded portion 80 at the other end. Holes 82—82 are formed through the bottoms of the receptacles 12—12 and holes 84—84 are formed in the flanges 74—74 in alignment with the holes 82—82 for receiving the bolts 76—76 with the heads 78—78 located inside the receptacles and the threaded portions 80—80 extending through apertures a in the vehicle body. Lock nuts 86—86 are secured to the inwardly projecting threaded portions of the bolts. If desired, the heads 78 of the bolts 76 may be recessed into the parts 14 so as to be flush with the bottoms of the receptacles. Since the heads 78—78 of the bolts are located within the receptacles and are inaccessible when skis are located in the receptacles and the lock nuts 86—86 are located inside the vehicle body and are inaccessible, it is virtually impossible to remove the rack from the vehicle. To make it even more difficult to detach the rack, for example, by sawing through or filing the bolts, sleeves 88—88 are mounted on the portions of the bolts situated between the part 70 and the flanges 74—74 which are slightly shorter than the distance between these parts and which are internally larger than the bolts so that they turn freely on the bolts.

The mounting frame 68 is also comprised of a stiff, rigid steel bent to shape and like the module is coated with an elastomer to provide smooth non-abrasive surfaces and to protect the surfaces from corrosion.

Figure 5:
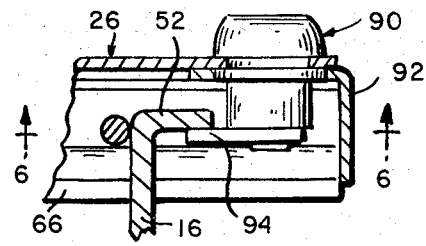
FIG. 5 is a fragmentary section at the distal end of the clamp bar showing alternative means for locking the bar in clamping position.
Figure 6:
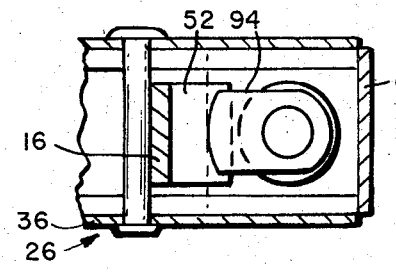
FIG. 6 is a section taken on the line 6—6 of FIG. 5.

Optionally, as shown in FIGS. 5 and 6, the pad lock may be replaced by a key-operated lock 90. As thus constructed, the hole 56 in the side 36 is omitted, the open end of the clamp bar 26 is closed by an angle member 92 and the key-operated lock 90 is mounted in the back part 34 of the clamping bar with its plate 94 located in a position to be moved into and out of engagement with the underside of the flange 52, on the one hand to lock the clamping bar in clamping position and on the other hand to release it to permit it to be raised.

It should be understood that the present disclosure is for the purpose of illustration only and that this invention includes all modifications and equivalents falling within the scope of the appended claims.

We claim:

1. A ski rack comprising a pair of transversely spaced, U-shaped, open top receptacles, each comprising a bottom part and spaced parallel side parts substantially perpendicular to the bottom part, means integrally connecting the receptacles with a predetermined space therebetween, a clamp bar pivotally connected at one end to the outer side part of one of the pair of receptacles, means at the other end of the clamp bar and on the outer side part of the other one of the pair of receptacles interengageable to latch the clamp bar across the open tops of the receptacles, a spacer frame to which the bottom parts of the rack are secured, said spacer frame having a rigid bar coextensive with the transverse length of the rack, legs at the ends of the bar substantially perpendicular thereto and extending therefrom in a direction opposite the side parts of the U-shaped receptacles, flanges at the lower ends of the legs at right angles thereto and extending inwardly toward each other, said bar and said flanges containing holes aligned with the holes in the bottom parts of the U-shaped receptacles for receiving attaching bolts, attaching bolts mounted in said holes with their head disposed inside the receptacles against the bottoms thereof and their shanks adopted to extend through apertures in a vehicle body to which lock nuts are applied and sleeves mounted on the attaching bolts between the bar and the flanges with their ends spaced from the bar and the flanges, said sleeves being freely rotatable relative to the bolt.

2. A structure according to claim 1, wherein the receptacles and the dividers are coated with a non-metallic layer such as to present non-abrasive surfaces for contact with the skis.

3. A ski rack comprising a pair of transversely spaced rigid, U-shaped, open-top receptacles, each comprising a bottom part and spaced parallel side parts substantially perpendicular to the bottom part, means integrally connecting the receptacles with a predetermined spacing therebetween, a clamp bar pivotally connected at one end to the outer side part of one of the pair of receptacles, the clamp bar being of U-shaped cross-section forming a channel, the outer side parts of the receptacles extending into the U-shaped clamp bar, one part embodying an eye adapted to receive a hinge pin fixed in the side walls of the channel and the other embodying a flange, and a latch mounted at the distal end of the bar within the channel having a hook releaseably engaged with said flange and a lip adapted to enable disengagement of the hook from the flange, said latch being adapted to be locked in latching position.

4. A ski rack according to claim 3, wherein the ends of the channel are closed by an angle member set into the open end of the pivoted end thereof and by a part of the latch at the other end.

5. A ski rack according to claim 3, wherein an element of the lock is secured to the clamp bar in a position to prevent the latch from being disengaged.

6. A module comprising a pair of transversely spaced, rigid U-shaped open-top receptacles, each comprising a bottom part adapted to be fastened to a supporting structure, and spaced parallel side parts, substantially perpendicular to the bottom part, the two inner adjacent side parts being shorter than the two outer side parts, said two inner parts being integrally joined at their upper ends by an intermediate V-shaped part extending downwardly from the upper ends toward the bottom of the structure and forming a third receptacle between the U-shaped receptacles, and yieldable divider members attached to the upper ends of the inner side parts said yieldable divider members having downwardly and outwardly extending portions which form with the outer part divergent entries into the Uwshaped receptacles and downwardly extending parallel portions which provide flat bearing surfaces facing the outer side parts, one of said outer parts having at its upper end an eye and at the other an outwardly extending lip, a clamp bar of U-shaped cross-section containing at one end openings in its side walls, a pin mounted through said openings and the eye pivotally supporting the clamp bar to the upper end of the one part, said bar containing interiorly thereof spaced parallel grooves, a latch plate slidably mounted at said end in said grooves for sliding movement lengthwise of the bar, said latch plate having at its inner end a latch element engageable with said outwardly extending part at the upper end of the outer part at that side, and spring means yieldably holding the latch member engaged with said part.

* * * * *